(12) United States Patent
Nishikawa et al.

(10) Patent No.: US 9,207,828 B2
(45) Date of Patent: Dec. 8, 2015

(54) TOUCH INPUT DEVICE AND ELECTRONIC APPARATUS

(75) Inventors: Kazuhiro Nishikawa, Kyoto (JP); Kazuhiko Takahata, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 1014 days.

(21) Appl. No.: 13/060,783

(22) PCT Filed: Aug. 21, 2009

(86) PCT No.: PCT/JP2009/064624
§ 371 (c)(1),
(2), (4) Date: Feb. 25, 2011

(87) PCT Pub. No.: WO2010/024192
PCT Pub. Date: Mar. 4, 2010

(65) Prior Publication Data
US 2011/0148800 A1    Jun. 23, 2011

(30) Foreign Application Priority Data
Aug. 25, 2008 (JP) ................................. 2008-214891

(51) Int. Cl.
*G06F 3/041* (2006.01)
*G06F 3/045* (2006.01)
(Continued)

(52) U.S. Cl.
CPC . *G06F 3/045* (2013.01); *B32B 7/12* (2013.01); *B32B 27/08* (2013.01); *B32B 27/30* (2013.01); *B32B 27/32* (2013.01); *B32B 27/36* (2013.01)

(58) Field of Classification Search
CPC .......... G09G 5/00; G09G 3/36; G02F 1/1333; G06F 3/041; G06F 3/045; B32B 27/08; B32B 27/32; B32B 27/30; B32B 27/36; B32B 7/12; Y10T 428/2848; C09J 2469/006; C09J 133/04; C09J 143/04

USPC ........... 345/173, 174; 428/1.5, 1.6, 1.61, 1.62
See application file for complete search history.

(56) References Cited

U.S. PATENT DOCUMENTS 6,507,337 B1    1/2003 Sato et al.
6,559,902 B1 *  5/2003 Kusuda et al. .................. 349/12
(Continued)

FOREIGN PATENT DOCUMENTS

EP    1 755 023    2/2007
JP    6-309101     11/1994
(Continued)

OTHER PUBLICATIONS

Extended European Search Report (in English language) issued Dec. 18, 2012 in corresponding European Patent Application No. 09 80 9843.

(Continued)

*Primary Examiner* — Grant Sitta
*Assistant Examiner* — Amen Bogale
(74) *Attorney, Agent, or Firm* — Wenderoth, Lind & Ponack, L.L.P.

(57) ABSTRACT

A touch input device of a resistance film system having a structure in which a plastic supporting plate (10), made from a polycarbonate resin or an acrylic resin, is bonded to an entire lower surface of a lower electrode film (7). An adhesive material (10*g*) is interposed between the lower electrode film and the plastic supporting plate. Also, a water-vapor barrier film (11), which is superior in moisture dimensional stability, is bonded with an adhesive material (11*g*) to the entire surface of the plastic supporting plate on the side opposite to the surface that is bonded to the lower electrode film.

14 Claims, 12 Drawing Sheets

(51) Int. Cl.

| | |
|---|---|
| B32B 7/12 | (2006.01) |
| B32B 27/08 | (2006.01) |
| B32B 27/30 | (2006.01) |
| B32B 27/32 | (2006.01) |
| B32B 27/36 | (2006.01) |

(56) References Cited

U.S. PATENT DOCUMENTS

| | | | |
|---|---|---|---|
| 7,161,588 B2* | 1/2007 | Nakanishi et al. | 345/173 |
| 7,348,964 B1* | 3/2008 | Gettemy et al. | 345/173 |
| 8,029,886 B2 | 10/2011 | Nashiki et al. | |
| 8,048,512 B2 | 11/2011 | Nashiki et al. | |
| 8,173,246 B2 | 5/2012 | Nashiki et al. | |
| 8,227,077 B2 | 7/2012 | Nashiki et al. | |
| 8,440,306 B2 | 5/2013 | Asai et al. | |
| 2002/0031622 A1* | 3/2002 | Ippel | G06F 3/0414 428/1.6 |
| 2002/0063518 A1* | 5/2002 | Okamoto et al. | 313/506 |
| 2004/0017363 A1* | 1/2004 | Nakanishi | G06F 3/041 345/173 |
| 2004/0135503 A1* | 7/2004 | Handa et al. | 313/511 |
| 2004/0239641 A1* | 12/2004 | Takahata et al. | 345/173 |
| 2004/0265602 A1* | 12/2004 | Kobayashi | B32B 7/02 428/458 |
| 2005/0202238 A1* | 9/2005 | Kishioka | B32B 7/12 428/355 AC |
| 2005/0280003 A1 | 12/2005 | Watanabe | |
| 2006/0046038 A1 | 3/2006 | Nakanishi et al. | |
| 2007/0214467 A1* | 9/2007 | Fukuda | G11B 7/2403 720/718 |
| 2007/0218957 A1 | 9/2007 | Nishikawa et al. | |
| 2007/0229475 A1* | 10/2007 | Gettemy | G06F 1/1626 345/173 |
| 2007/0257401 A1* | 11/2007 | Nakagawa et al. | 264/328.1 |
| 2007/0273568 A1* | 11/2007 | Fujii et al. | 341/144 |
| 2008/0090027 A1* | 4/2008 | Li et al. | 428/1.31 |
| 2008/0136788 A1 | 6/2008 | Nishikawa et al. | |
| 2008/0170041 A1* | 7/2008 | Inoue | G06F 3/045 345/173 |
| 2008/0213583 A1 | 9/2008 | Noguchi et al. | |
| 2008/0246741 A1* | 10/2008 | Hinata | 345/173 |
| 2009/0087655 A1* | 4/2009 | Yamada | B32B 7/12 428/354 |
| 2009/0091250 A1* | 4/2009 | Yasukawa et al. | 313/504 |
| 2009/0284475 A1 | 11/2009 | Nashiki et al. | |
| 2011/0148800 A1* | 6/2011 | Nishikawa et al. | 345/173 |

FOREIGN PATENT DOCUMENTS

| | | |
|---|---|---|
| JP | 10-329257 | 12/1998 |
| JP | 2003-091368 | 3/2003 |
| JP | 2004-285159 | 10/2004 |
| JP | 2005-166427 | 6/2005 |
| JP | 2006-72694 | 3/2006 |
| JP | 2006-085310 | 3/2006 |
| JP | 2007-103348 | 4/2007 |
| JP | 2008-9403 | 1/2008 |
| JP | 2008-036952 | 2/2008 |
| JP | 2008-41364 | 2/2008 |
| KR | 10-2007-0108879 | 11/2007 |
| TW | 200745924 | 12/2007 |
| TW | 200816236 | 4/2008 |
| TW | 200827163 | 7/2008 |
| TW | 200832452 | 8/2008 |

OTHER PUBLICATIONS

"Cyclic olefin copolymer", Aug. 11, 2008, XP055045686, Retrieved from Internet: URL:http://en.wikipedia.org/w/index.php?title=Cyclic_olefin_copolymer&oldid=231230995 [retrieved on Nov. 27, 2012].

"TOPAS cyclic olefin copolymer", Mar. 1, 2006, XP055031259, Retrieved from the Internet: URL:http://www.topas.com/topas_brochure_english.pdf [retrieved on Jun. 28, 2012].

Geoff Walker: "GD-Itronix DynaVue Display Technology, The Ultimate Outdoor-Readable Touch-Screen Display", Jun. 4, 2007, XP055047155, Retrieved from Internet: URL:http://www.ruggedpereview.com/3_technology_itronix_dynavue.htm, [retrieved on Dec. 7, 2012].

"ZeonorFilm", Jul. 25, 2008, XP055047159, Retrieved from Internet: URL:http://web.archive.org/web/20080725103551/http://www.zeonex.com/applications_zeonorfilm.asp, [retrieved on Dec. 7, 2012].

International Search Report issued Nov. 24, 2009 in International (PCT) Application No. PCT/JP2009/064624.

Patent Cooperation Treaty (PCT) International Preliminary Report on Patentability issued Mar. 17, 2011 in corresponding International Application No. PCT/JP2009/064624.

Search Report issued Aug. 6, 2014 in corresponding Taiwan patent application No. 098128229.

* cited by examiner

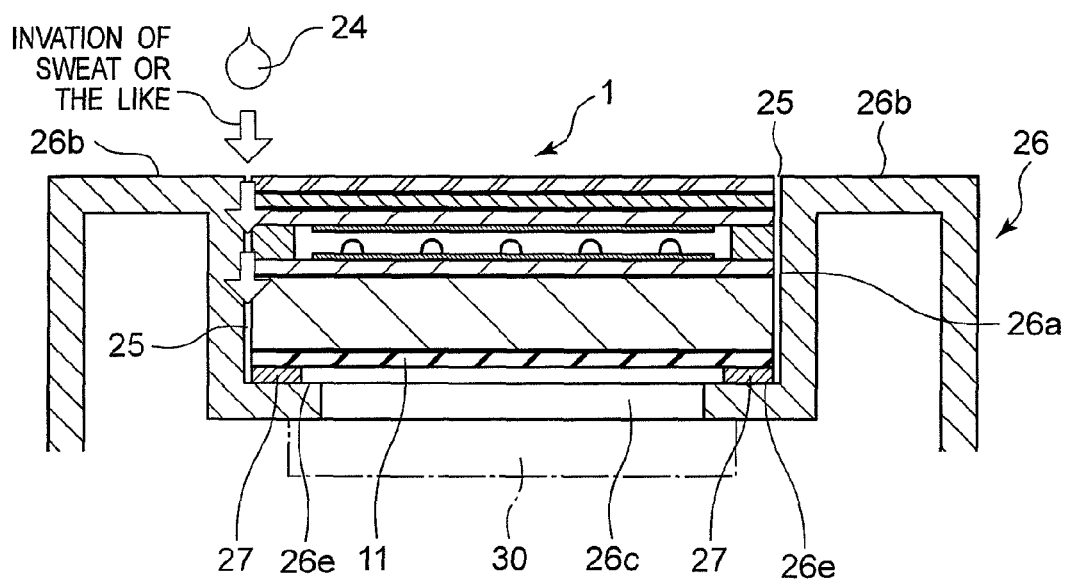

TOUCH INPUT DEVICE AND ELECTRONIC APPARATUS

BACKGROUND OF THE INVENTION

1. Technical Field

The present invention relates to a touch input device and an electronic apparatus provided with the touch input device, which are installed in a portable electronic apparatus, equipped with a display device having a liquid crystal panel, an organic EL panel or the like, such as a cordless telephone, a portable telephone, an electronic calculator, a sub-notebook personal computer, a PDA (personal-digital-assistant), a digital camera, a video camera, or the like, in which a positional input is carried out by pressing a screen with a finger, a pen, or the like, from above, in accordance with instructions viewed through the screen.

2. Description of the Related Art

As disclosed in JP-A No. 06-309101, a touch input device 100 having a general structure has been proposed in which an upper electrode film 104 having an electrode 103 made of a transparent conductive film formed on a lower surface of a transparent insulating film 102 and a lower electrode film 107 having an electrode 106 made of a transparent conductive film formed on an upper surface of a transparent insulating film 105 are disposed with the electrode sides thereof opposed to each other, with insulating spacers 108 interposed therebetween, and a plastic supporting plate 110 is bonded to the entire lower surface side of the lower electrode film 107, with an adhesive material being interposed therebetween (see FIG. 6).

In the touch input device 100 having the above-mentioned structure, when pressed with a finger, a pen or the like from the upper surface side of the upper electrode film 104, the corresponding upper electrode film 104 is warped, with the result that the electrodes 103 and 106, formed on the inner surfaces of the upper electrode film 104 and the lower electrode film 107, contact each other so that an inputted position is detected.

In this case, since the upper electrode film 104 and the lower electrode film 107 adopt film materials as their respective base members, the touch input device 100 is allowed to have rigidity by the plastic supporting plate 110 so as to protect a display device located on the back side from being damaged.

SUMMARY OF INVENTION

1. Issues to be Resolved by the Invention

At present, as the plastic supporting plate 110 of the touch input device 100, a polycarbonate resin that is superior in impact resistance, visibility, and processability, or an acrylic resin that is superior in moldability and visibility has been adopted in many cases; however, these materials are vulnerable to influences of the use environment, in particular, influences of a high-temperature and high-humidity environment.

More specifically, expansion/shrinkage of the plastic supporting plate 110 tends to occur due to water absorption (moisture absorption). As a result, a stress in the expanding or shrinking direction is applied to the electrode 106 made of the transparent conductive film of the lower electrode film 107 bonded to the upper surface of the plastic supporting plate 110, with the result that the electrode 106 deteriorates resulting in an issue of failing to provide reliability and input stability of the touch input (see FIG. 7).

Moreover, in addition to the physical deterioration, moisture 114, absorbed (moisture-absorbed) by the plastic supporting plate 110, is allowed to further permeate through the adhesive layer and the transparent insulating film 105 forming the lower electrode film 107 to reach the electrode 106 made of the transparent conductive film to cause chemical deterioration of the electrode, with the result that reliability and input stability of the touch input might become unobtainable.

Moreover, these issues are exacerbated in the case where the transparent insulating film 105 forming the lower electrode film 107 is the same material as that of the plastic supporting plate 110.

In view of the above-mentioned related art issues, it is an object of the present invention to provide a touch input device provided with a plastic supporting plate made from a polycarbonate resin or an acrylic resin, which is less susceptible to degradation of the reliability and input stability of touch input, depending on the use environment, and an electronic apparatus equipped with the touch input device.

2. Means for Resolving the Issues

In order to resolve the above-mentioned technical issues, the present invention provides a touch input device and an electronic apparatus equipped with the touch input device, which have the following structures.

According to a first aspect of the present invention, there is provided a touch input device, which is a touch input device of a resistance film system having at least a structure in which an upper electrode film provided with an upper electrode made of a transparent conductive film formed on a lower surface of a transparent insulating film, and a lower electrode film provided with a lower electrode made of a transparent conductive film formed on an upper surface of a transparent insulating film, are disposed, with the upper electrode and the lower electrode being opposed to each other with insulating spacers interposed therebetween, and a plastic supporting plate, made from a polycarbonate resin or an acrylic resin, is bonded to an entire lower surface of the lower electrode film, with an adhesive material being interposed therebetween.

The touch input device comprises: a water-vapor barrier film used for improving a moisture-resistant property of the plastic supporting plate that is bonded to the entire lower surface of the lower electrode film, with an adhesive material being interposed therebetween.

According to a second aspect of the present invention, there is provided the touch input device according to the first aspect, wherein the water-vapor barrier film has properties of a water-absorbing rate of from larger than 0% to not larger than 0.1% and a moisture expansion coefficient of $4.0 \times 10^{-6}$ cm/cm/% RH or less, and is positioned on a lower surface of the plastic supporting plate.

According to a third aspect of the present invention, there is provided the touch input device according to the first aspect, wherein the transparent insulating film forming the lower electrode film is made from a same material as that of the plastic supporting plate, and the water-vapor barrier film has properties of a water-absorbing rate of from larger than 0% to 0.1% or less and a moisture expansion coefficient of $4.0 \times 10^{-6}$ cm/cm/% RH or less, and is positioned between the lower electrode film and the plastic supporting plate.

According to a fourth aspect of the present invention, there is provided the touch input device according to the second or third aspect, wherein the water-vapor barrier film is made of a cyclo-olefin polymer film.

According to a fifth aspect of the present invention, there is provided the touch input device according to the second or third aspect, wherein the water-vapor barrier film is made of a cyclo-olefin copolymer film.

According to a sixth aspect of the present invention, there is provided the touch input device according to the first or third aspect, wherein the plastic supporting plate has a thickness of 0.5 to 2 mm and the water-vapor barrier film has a thickness of 50 to 200 µm.

According to a seventh aspect of the present invention, there is provided the touch input device according to the first or third aspect, wherein a design film having a transparent window portion is placed on the entire upper surface of the upper electrode film with an adhesive material being interposed therebetween.

According to an eighth aspect of the present invention, there is provided the touch input device according to the first or third aspect, further comprising:

a protective layer for a water-vapor barrier film placed on one of surfaces of the water-vapor barrier film, that is, on a surface on an opposite side to an opposed surface to the plastic supporting plate.

According to a ninth aspect of the present invention, there is provided the touch input device according to the first or third aspect, further comprising a protective layer for a water-vapor barrier film placed between the plastic supporting plate and the water-vapor barrier film.

According to a tenth aspect of the present invention, there is provided the touch input device according to the first or third aspect, wherein protective layers for a water-vapor barrier film are respectively placed on two surfaces of the water-vapor barrier film.

According to an 11th aspect of the present invention, there is provided the touch input device according to the first or third aspect, wherein the water-vapor barrier film is a rectangular film, and has a slit being formed on an area other than a visible area of the water-vapor barrier film, along each of longer sides opposed to each other.

According to a 12th aspect of the present invention, there is provided the touch input device according to the first or third aspect, wherein the water-vapor barrier film is a rectangular film, and has a slit that has a rectangular frame shape being placed on an area other than a visible area of the water-vapor barrier film.

According to a 13th aspect of the present invention, there is provided the touch input device according to the first or third aspect, wherein the water-vapor barrier film is a rectangular film, and the water-vapor barrier film is placed in an area that is larger than a visible area of the touch input device, and also smaller than an opposed surface of the plastic supporting plate to the water-vapor barrier film.

According to a 14th aspect of the present invention, there is provided an electronic apparatus comprising:

a casing provided with a concave section for use in fitting a touch input device thereto;

a display device disposed on a bottom surface of the concave section of the casing; and the touch input device disclosed in the first or second aspect that is fitted to the concave section of the casing so as to cover the display device.

According to a 15th aspect of the present invention, there is provided an electronic apparatus comprising:

a casing having a concave section for use in fitting a touch input device thereto, provided with an opening formed on a bottom surface thereof;

a display device that is disposed on a back side of the concave section so as to allow a display screen to be exposed to the opening of the bottom surface of the concave section of the casing; and the touch input device disclosed in the first or second aspect that is fitted to the concave section of the casing so as to cover the display screen of the display device.

3. Effects of the Invention

In the touch input device provided with the plastic supporting plate made from the polycarbonate resin or the acrylic resin, the water-vapor barrier film for improving the moisture-resistant property of the plastic supporting plate, which is bonded to the entire lower surface of the lower electrode film by using the adhesive material, hardly absorbs water (absorbs moisture) and is less susceptible to expansion and shrinkage, even under the use environment in which the plastic supporting plate would cause water absorption (moisture absorption) to be expanded or shrunk. Therefore, in the case where the water-vapor barrier film is positioned on the lower surface of the plastic supporting plate, it becomes possible to directly prevent the water absorption (moisture absorption) of the plastic supporting plate. Moreover, in the case where the water-vapor barrier film is positioned between the lower electrode film and the plastic supporting plate, even if the plastic supporting plate absorbs water (absorbs moisture), a stress caused in the expanding/shrinking direction in the plastic supporting plate is alleviated from being applied to the electrode made of the transparent conductive film of the lower electrode film.

Moreover, in the case where the water-vapor barrier film is positioned on the lower surface side of the lower electrode film, it is possible to prevent moisture from permeating every place through the transparent insulating film forming the lower electrode film to reach the electrode formed by the transparent conductive film.

Furthermore, in the case where the water-vapor barrier film is positioned on the lower surface side of the lower electrode film, it is possible to prevent the transparent insulating film from absorbing water (absorbing moisture) to expand and shrink even when the transparent insulating film forming the lower electrode film is the same material as that of the plastic supporting plate.

By the functions of the water-vapor barrier film, the touch input device and the electronic apparatus of the present invention are less vulnerable to physical and chemical deterioration of the electrode due to the use environment, and make it possible to maintain superior reliability and input stability of the touch input.

BRIEF DESCRIPTION OF THE DRAWINGS

These and other aspects and features of the present invention will become clear from the following description taken in conjunction with the preferred embodiments thereof with reference to the accompanying drawings, in which:

FIG. 10C is a partial cross-sectional view of an electronic apparatus of a touch window type equipped with a touch input device in accordance with still another embodiment of the present invention;

DETAILED DESCRIPTION OF THE INVENTION

Figure 1:
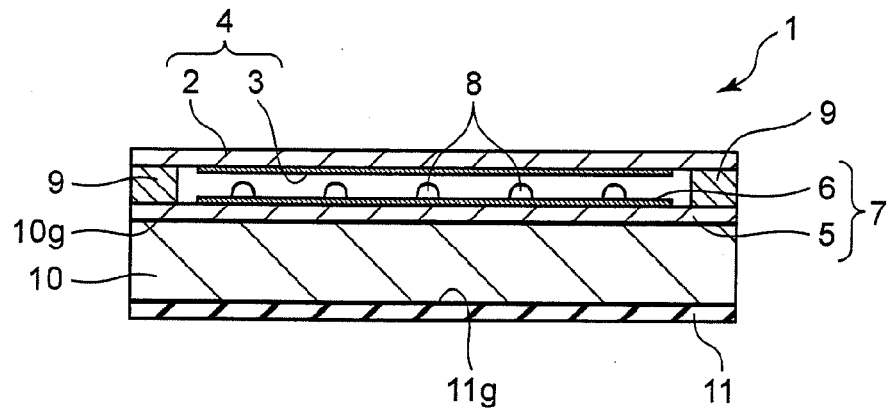
FIG. 1 is a cross-sectional view showing a touch input device in accordance with one embodiment of the present invention.

Before the description of the present invention proceeds, it is to be noted that like parts are designated by like reference numerals throughout the accompanying drawings.

Referring to drawings, the following description will discuss embodiments of the present invention in detail.

FIG. 1 is a cross-sectional view showing a touch input device 1 in accordance with one embodiment of the present invention. In FIG. 1, the touch input device 1 is provided with an upper electrode film 4, a lower electrode film 7, a plastic supporting plate 10, and a transparent water-vapor barrier film 11.

The upper electrode film 4 has an upper electrode 3 made of a transparent conductive film formed on the lower surface of a transparent insulating film 2.

The lower electrode film 7 has a lower electrode 6 made of a transparent conductive film formed on the upper surface of a transparent insulating film 5.

The upper electrode film 4 and the lower electrode film 7 are disposed, with insulating spacers 8 being interposed therebetween, so as to allow the upper electrode 3 and the lower electrode 6 to be opposed to each other.

The plastic supporting plate 10 is bonded to the entire surface of the lower surface of the lower electrode film 7, with an adhesive material 10g for fixing the plastic supporting plate being interpolated therebetween.

Moreover, the water-vapor barrier film 11 that is transparent and superior in moisture dimension stability is bonded to the entire lower surface of the plastic supporting plate 10, with an adhesive material 11g for fixing the water-vapor barrier film being interpolated therebetween. In this case, the expression "superior in moisture dimension stability" refers to the fact that the plastic supporting plate 10 has a function of improving a water-resistant or moisture-resistant property, and more specifically, refers to the state that the rate of shrinkage of the barrier film in a high moisture environment (70% RH or more) is set to 0.1% or less.

In this manner, the upper electrode film 4 and the lower electrode film 7 are disposed, with insulating spacers 8 being interposed therebetween, so as to allow the upper electrode 3 and the lower electrode 6 to be opposed to each other; thus, it is possible to obtain a touch input function of a low-resistant film system. That is, when pressed at the upper surface side of the upper electrode film 4 by a finger, or a pen, or the like, the upper electrode film 4 is warped, with the result that the respective electrodes 3 and 6, formed on the inner surfaces of the upper electrode film 4 and the lower electrode film 7, contact each other so that an input position is detected.

The plastic supporting plate 10 is a resin plate used for allowing the touch input device 1 to have rigidity so as to protect a display device 30 (see FIGS. 10A and 10B) on the back side from damages. As the material for this, a polycarbonate resin (PC) that is superior in impact resistance, visibility, and processability, or an acrylic resin (PMMA) that is superior in moldability and visibility may be used. Moreover, the polycarbonate resin and the acrylic resin are inexpensive, and are advantageous in comparison with other plastic materials, from the viewpoint of cost merit.

The thickness of the plastic supporting plate 10 is preferably set to about 0.5 to 2 mm. In the case where the thickness is less than 0.5 mm, the rigidity becomes insufficient, failing to protect the display device 30 (see FIGS. 10A and 10B) on the back side of the plastic supporting plate 10 from being damaged, upon touch input by a finger or a pen or the like. Moreover, in the case where the thickness exceeds 2 mm, it becomes difficult to make thinner the touch input device 1 and the electronic apparatus provided with the device.

Furthermore, at least, one surface of the plastic supporting plate 10 may be subjected to a hard coating treatment.

The water-vapor barrier film 11 hardly absorbs water (absorbs moisture) even under a use environment in which, when the plastic supporting plate 10 is exposed, the plastic supporting plate 10 is caused to absorb water (absorb moisture) resulting in expansion and shrinkage in the plastic supporting plate 10, and has little expansion and shrinkage. In order to obtain the effects described in the present specification, as the material for this, for example, those materials which have a water-absorbing rate of larger than 0% (for example, 0.001% or more, from the reason of production) to 0.1% or less and a moisture expansion coefficient of $4.0 \times 10^{-6}$ cm/cm/% RH or less, more preferably, a water-absorbing rate of larger than 0% (for example, 0.001% or more, from the reason of production) to 0.01% or less and a moisture expansion coefficient of $3.0 \times 10^{-6}$ cm/cm/% RH or less, may be used. In the case where the water-absorbing rate exceeds 0.1%, it might be difficult to achieve the desired effects of the present invention. By setting the upper limit value of the water-absorbing rate to 0.01% or less, it becomes possible to more positively achieve the desired effects of the present invention.

As the film having these characteristics, a cyclo-olefin polymer film or a cyclo-olefin copolymer film is proposed, and specific examples thereof include: a Zeonoa film made by Zeon Corporation (water-absorbing rate: 0.01%, moisture expansion coefficient: $2.6 \times 10^{-6}$ cm/cm/% RH), an ARTON made by JSR Corporation, and an APEL made by Mitsui Chemical Inc. As the acrylic plate, those having a water-absorbing rate of 0.3% and a moisture expansion coefficient of $40 \times 10^{-6}$ cm/cm/% RH may be used, and as the polycarbonate plate, those having a water-absorbing rate of 0.24% and a moisture expansion coefficient of $5.0 \times 10^{-6}$ cm/cm/% RH may be used.

In the above-mentioned embodiment, since the water-vapor barrier film 11 is positioned on the lower surface of the plastic supporting plate 10, it is possible to prevent the plastic supporting plate 10 from absorbing water (absorbing moisture). That is, no expansion and shrinkage of the plastic supporting plate 10 due to water absorption (moisture absorption) occurs, with the result that no stress in the expanding and shrinking direction is applied to the lower electrode 6 formed by the transparent conductive film of the lower electrode film 7 bonded to the upper surface of the plastic supporting plate 10. Therefore, the lower electrode 6 is prevented from physically deteriorating due to the use environment, thereby making it possible to maintain the reliability and input stability of the touch input.

Moreover, the water-vapor barrier film 11 can prevent moisture 114 from passing through the transparent insulating film 5 forming the lower electrode film 7 and reaching the lower electrode 6 made of the transparent conductive film. Therefore, the lower electrode 6 is also prevented from chemically deteriorating due to the use environment, thereby making it possible to maintain the reliability and input stability of the touch input.

The thickness of the water-vapor barrier film 11 is preferably set in a range of from about 50 to 200 μm. In the case where the thickness is less than 50 μm, it becomes difficult to handle the film. Moreover, in the case where the thickness exceeds 200 μm, the material cost of the water-vapor barrier film 11 increases, impairing the cost merit thereof. With respect to the cost merit, the following structure may be proposed. That is, in the embodiment of the present invention, the water-vapor barrier film 11 is prepared as a member separated from the plastic supporting member 10 made from a polycarbonate resin or an acrylic resin; however, without using the water-vapor barrier film 11, the aforementioned resin plate made from a material, such as a cyclo-olefin polymer or a cyclo-olefin copolymer, may be used as the plastic supporting plate. However, in the case where, by using the material such as a cyclo-olefin polymer or a cyclo-olefin copolymer, a molded product is formed with a thickness that sufficiently provides rigidity required for the plastic supporting plate 10, an issue of high cost is caused. Moreover, the resin plate is also poor in processability, making it difficult to provide a large-size product (for example, size of 500 mm in longitudinal length×500 mm in lateral length or more, with a thickness of 0.4 mm or more). In other words, when a large-size product is formed, deviations tend to occur in thickness and a warp is easily generated. Therefore, a combination of the plastic supporting plate 10 having a thickness of 0.5 to 2 mm, made from a polycarbonate resin or an acrylic resin, and the water-vapor barrier film 11 having a thickness of 50 to 200 μm does not cause the above issue, thereby providing a significant advantage. More preferably, the thickness of the water-vapor barrier film 11 is set to 50 to 100 μm. By setting the upper limit value of the thickness of the water-vapor barrier film 11 to 100 μm, it becomes possible to more positively achieve the desired effects of the present invention.

Additionally, the water-vapor barrier film 11 is placed on the lower surface of the plastic supporting plate 10 so that the plastic supporting plate 10 is prevented from absorbing water; therefore, even in the case where the transparent insulating film 5 forming the lower electrode film 7 positioned on the upper surface side is made from the same material as that of the plastic supporting plate 10 (for example, the transparent insulating film 5 forming the lower electrode film 7 is a polycarbonate-based material, and the plastic supporting plate 10 is made from a polycarbonate resin), the transparent insulating film 5 is prevented from absorbing water (absorbing moisture) to expand and shrink.

Figure 2:
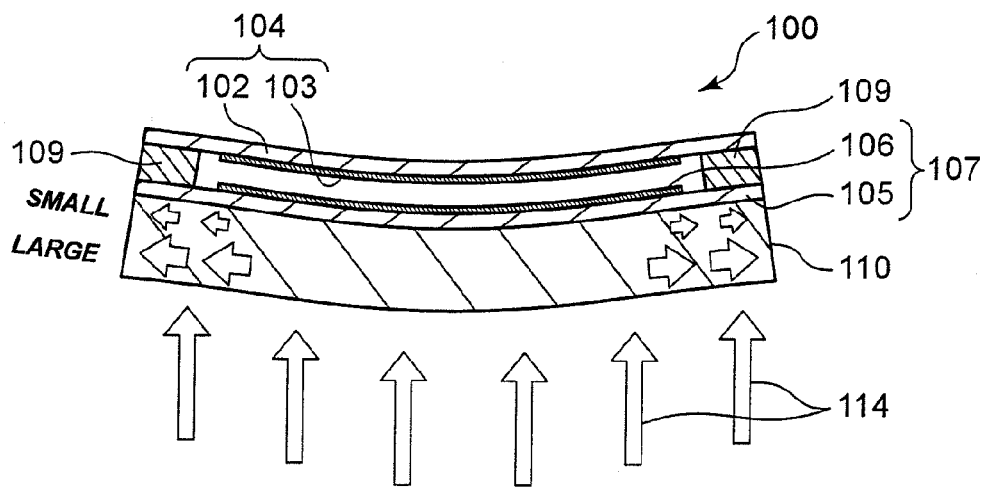
FIG. 2 is a cross-sectional view that explains a warp of a conventional plastic supporting plate.

Moreover, the embodiment also provides effects relating to the outside appearance, in addition to the effects of the touch input reliability and input stability. As described earlier, since the water-vapor barrier film 11 that is superior in dimension stability against moisture is bonded to the entire lower surface of the plastic supporting plate 10 with an adhesive material interpolated therebetween, the expansion and shrinkage of the plastic supporting plate 10 due to water absorption (moisture absorption) can be presented. In the case where no water-vapor barrier film 11 is present, expansion or shrinkage occurs in the plastic supporting plate 10, and the degree of the expansion or shrinkage becomes greater on the lower surface side that is exposed than that on the upper surface side of the two surfaces of the plastic supporting plate 10, with the result that a warp sometimes occurs due to the expansion or shrinkage (see FIG. 2). This issue of the warp can also be removed by bonding the water-vapor barrier film to the entire lower surface of the plastic supporting plate 10 with an adhesive material being interpolated therebetween.

Figure 3:
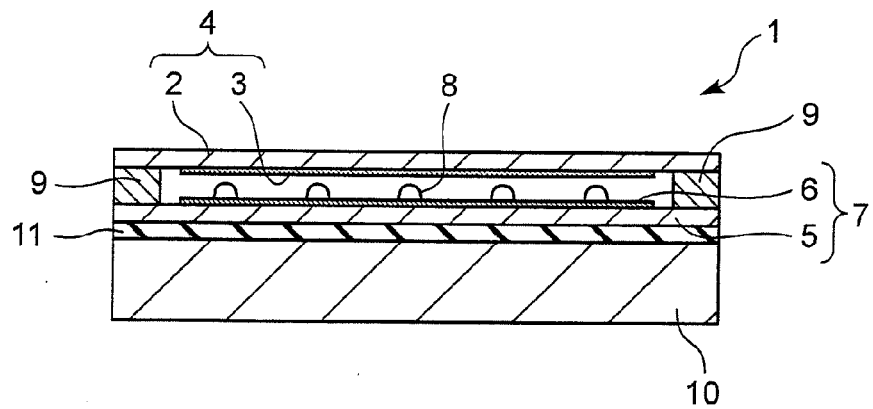
FIG. 3 is a cross-sectional view showing a touch input device in accordance with another embodiment of the present invention.

Moreover, in place of the lower surface of the plastic supporting plate 10, the configuration position of the water-vapor barrier film 11 may be set between the lower electrode film 7 and the plastic supporting plate 10 (see FIG. 3).

In the embodiment shown in FIG. 3, the water-vapor barrier film 11 is positioned between the lower electrode film 7 and the plastic supporting plate 10; therefore, even when the plastic supporting plate 10 absorbs water (absorbs moisture), it is possible to alleviate stress to be applied in the expanding or shrinking direction of the plastic supporting plate 10 to the lower electrode 6 formed by the transparent conductive film of the lower electrode film 7. Therefore, in this embodiment also, the lower electrode 6 is prevented from physically deteriorating due to the use environment, thereby making it possible to maintain the reliability and input stability of the touch input.

Furthermore, the water-vapor barrier film 11 makes it possible to prevent moisture 114 from passing through the transparent insulating film 5 forming the lower electrode film 7 and reaching the lower electrode 6 made of the transparent conductive film. Therefore, the lower electrode 6 is also prevented from chemically deteriorating due to the use environment, thereby making it possible to maintain the reliability and input stability of the touch input.

Figure 5:
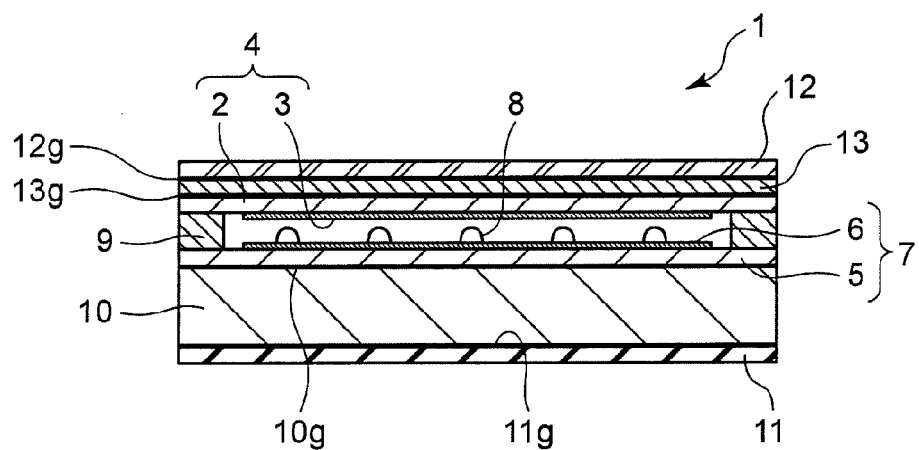
FIG. 5 is a cross-sectional view showing a touch input device in accordance with another embodiment of the present invention.
Figure 6:
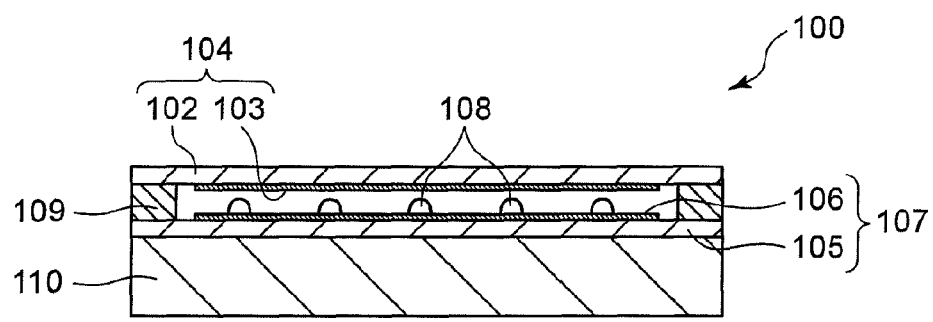
FIG. 6 is an exploded view that shows one example of a touch input device relating to the conventional art.
Figure 7:
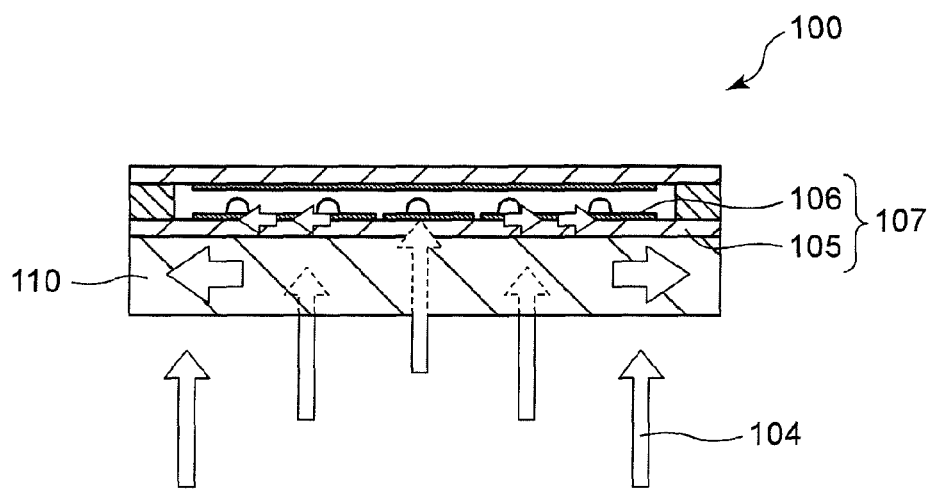
FIG. 7 is a view that explains an issue caused by an expansion of the plastic supporting plate.

Moreover, a polarizing plate 13 may be placed on the upper surface of the upper electrode film 4 (see FIG. 5). By placing the polarizing plate 13 thereon, reflected light can be reduced even during outdoor-use so that the liquid crystal screen can be viewed easily. In particular, by using a ¼λ phase-difference film for each of the upper electrode film 4 and the lower electrode film 7, the upper electrode film 4 is allowed to have a circular polarizing function, when this film is used in combination with the polarizing plate 13, so that reflection on the interface between the transparent conductive film and the air layer can be virtually eliminated; therefore, the visibility can be improved even during outdoor-use.

From the viewpoint of visibility, the visibility is also important for the water-vapor barrier film 11 because the water-vapor barrier film 11 is one component of the touch panel 1, and its birefringence needs to be set to 10 nm or less. As such a material, the aforementioned cyclo-olefin polymer or cyclo-olefin copolymer is appropriately used.

Moreover, as the transparent insulating films 1 and 5 for use in the upper electrode film 4 and the lower electrode film 7, transparent resin films, made from engineering plastics, such as a polycarbonate-based, polyamide-based, or a polyetherketone-based engineering plastics, or resins, such as an acrylic-based or polyethylene terephthalate-based, or polybutylene terephthalate-based resin, may be used respectively.

As the transparent conductive film forming the upper electrode 3 and the lower electrode 6, metal oxide films, such as tin oxide, indium oxide, antimony oxide, zinc oxide, cadmium oxide, or indium-tin oxide (ITO), composite films mainly including these metal oxides, and metal films, made of gold, silver, copper, nickel, tin, aluminum, or palladium, may be used. The conductive film may be prepared as a multi-layered film. As the forming method for the conductive film, a method, such as a vacuum vapor deposition method, a sputtering method, an ion plating method, or a CVD method, may be used.

As the electrodes 3 and 6, rectangular patterns, each having a large area, are respectively formed on the upper electrode film 4 and the lower electrode film 7 one by one. Alternatively, the electrodes 3 and 6 may be prepared as patterns with a plurality of rectangular stripes arranged side by side, placed on the upper electrode film 4 and the lower electrode film 7, and the two patterns are allowed to intersect with each other to form a matrix. Moreover, wires, such as bus bars or routing circuits, are connected to the respective electrodes 3 and 6. The wires are formed by using metal, such as gold, silver, copper, or nickel, or a conductive paste using carbon or the like, through a printing method, such as a screen printing method, an offset printing method, a gravure printing method, or a flexographic printing method, a photo-resist method or a brush-painting method.

The insulating spacers 8, which are used for preventing adhesion at the time of inputting or for improving the chattering characteristic, are formed into dot shapes on either the electrode 3 or 6 of the upper electrode film 4 or the lower electrode film 7. For example, a transparent photo-curable resin, such as an acrylate resin, such as a melamine acrylate resin, a urethane acrylate resin, an epoxy acrylate resin, a methaacryl-acrylate resin, or an acryl-acrylate resin; or polyvinyl alcohol resin, may be used, and this material is formed into fine dot shapes by using a photo-curing process. Moreover, a large number of fine dots may be formed by using a printing method to provide the insulating spacers 8.

The upper electrode film 4 and the lower electrode film 7 are bonded at the peripheral edge portion. As a bonding layer 9 to be used, a double-sided tape or an insulating adhesive, made from an acrylic resin, an epoxy resin, a phenolic resin, or a vinyl resin, may be used.

Figure 4:
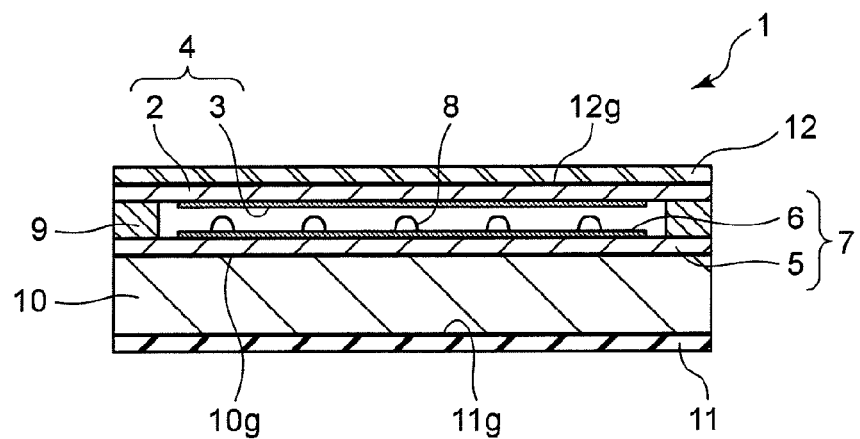
FIG. 4 is a cross-sectional view showing a touch input device in accordance with another embodiment of the present invention.

Moreover, a design film 12 having a transparent window portion may be placed on the upper surface of the upper electrode film 4 with an adhesive material 12g interpolated therebetween (see FIG. 4). The design film 12 has a structure in which a decorative layer is formed on one surface of a material made of the same material as that of the upper electrode film 4, in a manner so as to cover the periphery of the transparent window portion, that is, wires such as the bus bars or the routing circuits, with its pattern portion. The portion covered with the decorative layer corresponds to the pattern portion, and the other portion that is not covered with the decorative layer forms the transparent window portion. With this arrangement, the touch input device 1 is allowed to serve as a protective panel for the screen of the display device (see FIGS. 10A and 10B), and the outer surface of the touch input device 1 is allowed to form the same plane as the outer surface of a front exterior casing in the electronic apparatus such as a portable telephone, a smart telephone, or the like, that is, the touch input device 1 is allowed to form one portion of the front exterior casing.

The decorative layer is preferably formed by using a colored ink containing, as a binder, a resin such as polyvinyl-based resin, polyamide-based resin, polyester-based resin, polyacryl-based resin, polyurethane-based resin, polyvinylacetal-based resin, polyesterurethane-based resin, or alkyd resin, and a pigment or a dye having an appropriate color as a colorant. As the method for forming the decorative layer, for example, a normal printing method, such as a screen printing method, an offset printing method, a gravure printing method, or a flexographic printing method, may be used.

Moreover, the decorative layer may be constituted by a metal thin-film layer, or may be formed by a combination of a pattern printing layer and a metal thin film. The metal thin-film layer, which demonstrates metallic gloss as the decorative layer, may be formed by using a method, such as a vacuum vapor deposition method, a sputtering method, an ion plating method, or a plating method. In this case, in accordance with a desired metal glossy color to be demonstrated, metal, such as aluminum, nickel, gold, platinum, chromite, copper, tin, indium, silver, titanium, lead, or zinc, or an alloy, or a compound of these, may be used.

Furthermore, a hard-coat layer or a hard-coat film may be placed on the upper surface of the design film 12. A low-reflection layer and a finger-print preventive layer may be formed on the uppermost surface of the touch input device 1.

In the case of a structure in which the polarizing plate 13 is placed on the upper electrode film 4 with an adhesive material 13g interpolated therebetween, the design film 12 may be formed on the upper surface of the polarizing plate 13, with an adhesive material 12g interpolated therebetween, in the same manner (see FIG. 5). Moreover, a hard-coat layer or a hard-coat film may be placed on the upper surface of the design film 12. A low-reflection layer or a finger-print preventive layer may be formed on the uppermost surface of the touch input device 1.

Normally, lead-out lines (wires) of the touch input device 1 are prepared by inserting an FPC (Flexible Printed Circuit Board) between the upper electrode film 4 and the lower electrode film 7 from the side thereof so as to be drawn out; however, another structure may be used in which through holes are formed in the lower electrode film 7, the plastic supporting plate 10, and the water-vapor barrier film 11 so that electric signals can be taken out by an FPC 10 (see FIG. 10B) from the back side of the touch input device 1 through the through holes.

In the above-mentioned respective embodiments, a hard coat layer 21, which functions as a protective layer for the water-vapor barrier film for preventing adhesion of a solvent or fat and oil, or the like, may be placed on the outer surface of the water-vapor barrier film 11. The reasons for placing the hard coat layer 21 on the outer surface of the water-vapor barrier film 11 are explained below.

Figure 8A:
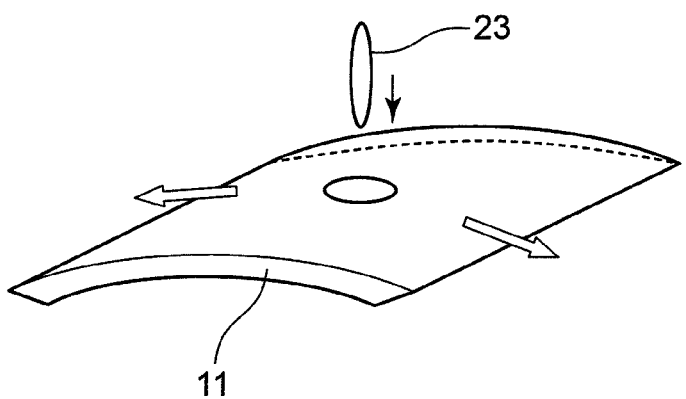
FIG. 8A is an explanatory view that shows a state in which a solvent, fat and oil, or the like adheres to a water-vapor barrier film.
Figure 8B:
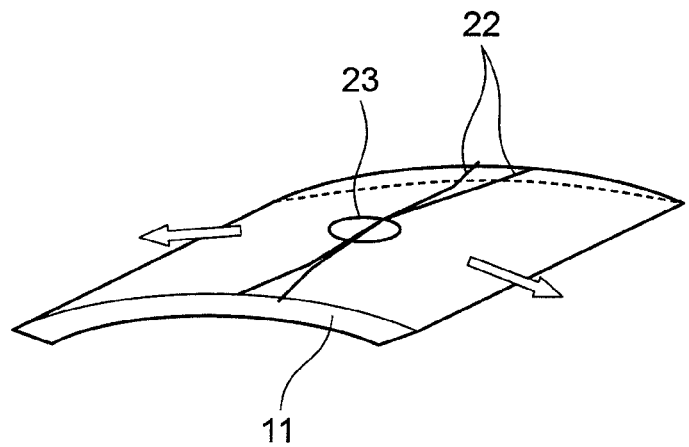
FIG. 8B is an explanatory view that explains the fact that, when, for example, a tensile stress is applied to a water-vapor barrier film by bending the water-vapor barrier film, with a solvent, fat and oil, or the like adhering to the water-vapor barrier film as shown in FIG. 8A, a crack occurs at the portion to which the solvent, fat and oil, or the like adheres.

Upon bonding the water-vapor barrier film 11 to the plastic supporting plate 10 during the manufacturing processes, or upon inspecting the finished products, the worker erroneously touches the water-vapor barrier film 11 with a bare hand, or sweat, saliva, or the like of the worker is erroneously adhered to the water-vapor barrier film 11, with the result that a solvent, or fat and oil tends to adhere to the water-vapor barrier film 11. In this case, when, as shown in FIG. 8A, for example, a tensile stress is applied to the water-vapor barrier film 11, for example, by bending the water-vapor barrier film 11, with the solvent, fat and oil, or the like adhering to the water-vapor barrier film 11, a crack 22 might occur at the portion to which the solvent, fat and oil 23, or the like has adhered, as shown in FIG. 8B.

Figure 9A:
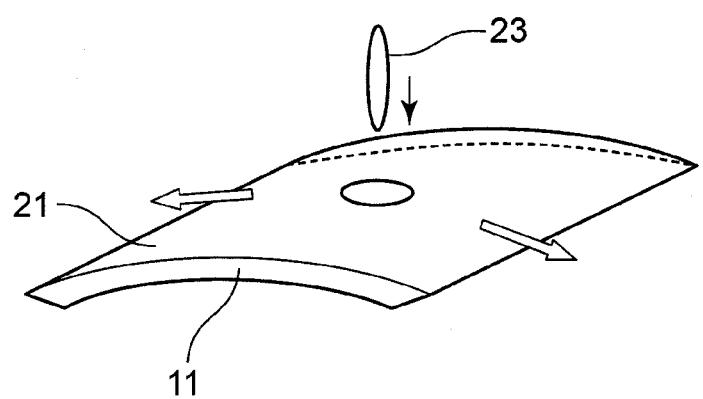
FIG. 9A is an explanatory view that shows a state in which a solvent, fat and oil, or the like adheres to a water-vapor barrier film on which a hard coat layer is placed.
Figure 9B:
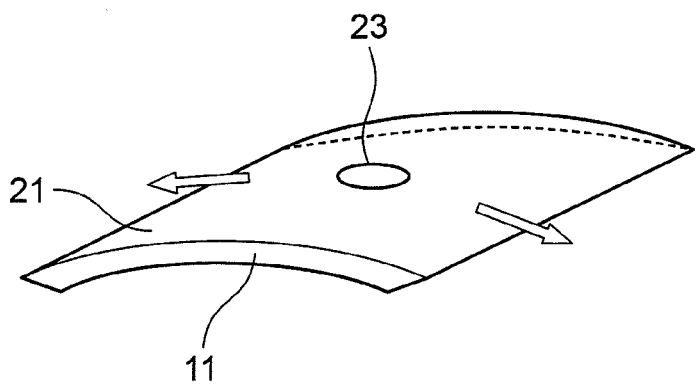
FIG. 9B is an explanatory view that explains the fact that, when, for example, a tensile stress is given to a water-vapor barrier film by bending the water-vapor barrier film on which the hard coat layer is placed, with a solvent, fat and oil, or the like adhering to the water-vapor barrier film as shown in FIG. 9A, no crack is caused at the portion to which the solvent, fat and oil, or the like adheres.

In order to prevent this, by placing the hard coat layer 21 on the water-vapor barrier film 11, it becomes possible to effectively prevent a solvent or fat and oil, or the like from adhering to the water-vapor barrier film 11 (see FIGS. 9A and 9B). That is, FIG. 9A is an explanatory view that shows a state in which a solvent, fat and oil, or the like adheres to a water-vapor barrier film 11 on which a hard coat layer 21 is placed. As shown in FIG. 9A, even when, for example, a tensile stress is applied to the water-vapor barrier film 11 on which the hard coat layer 21 has been formed, by bending the water-vapor barrier film 11, with the solvent, fat and oil, or the like adhering to the water-vapor barrier film 11, no crack occurs at the portion to which the solvent, fat and oil, or the like adheres, as shown in FIG. 9B. This is because the hard coat layer 21 prevents the solvent, fat and oil, or the like from entering the materials forming the water-vapor barrier film 11, and subsequently preventing the degradation.

Figure 10A:
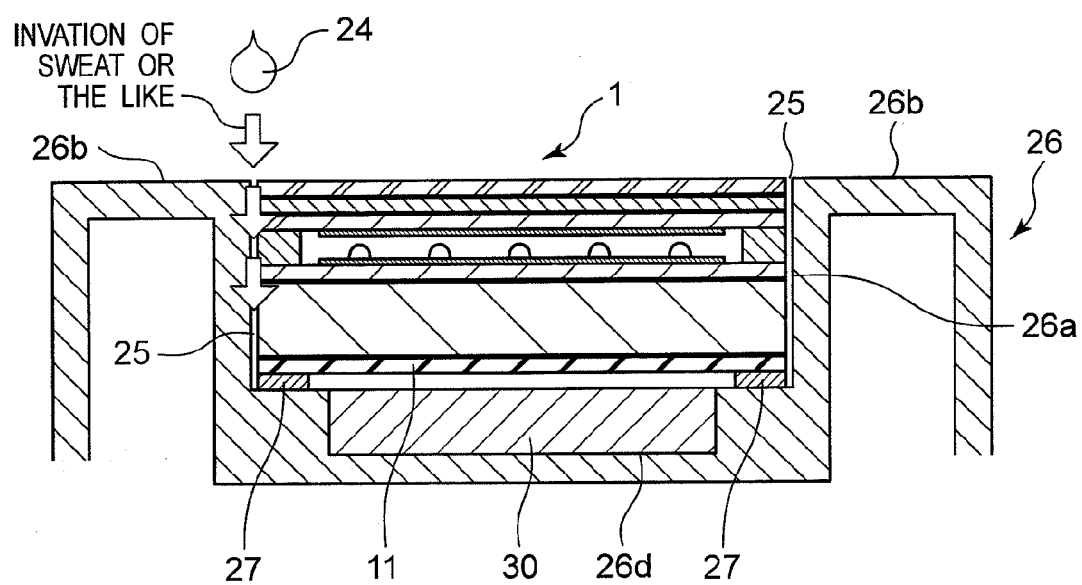
FIG. 10A is a partial cross-sectional view of an electronic apparatus of a touch window type equipped with a touch input device in accordance with another embodiment of the present invention.
Figure 10B:
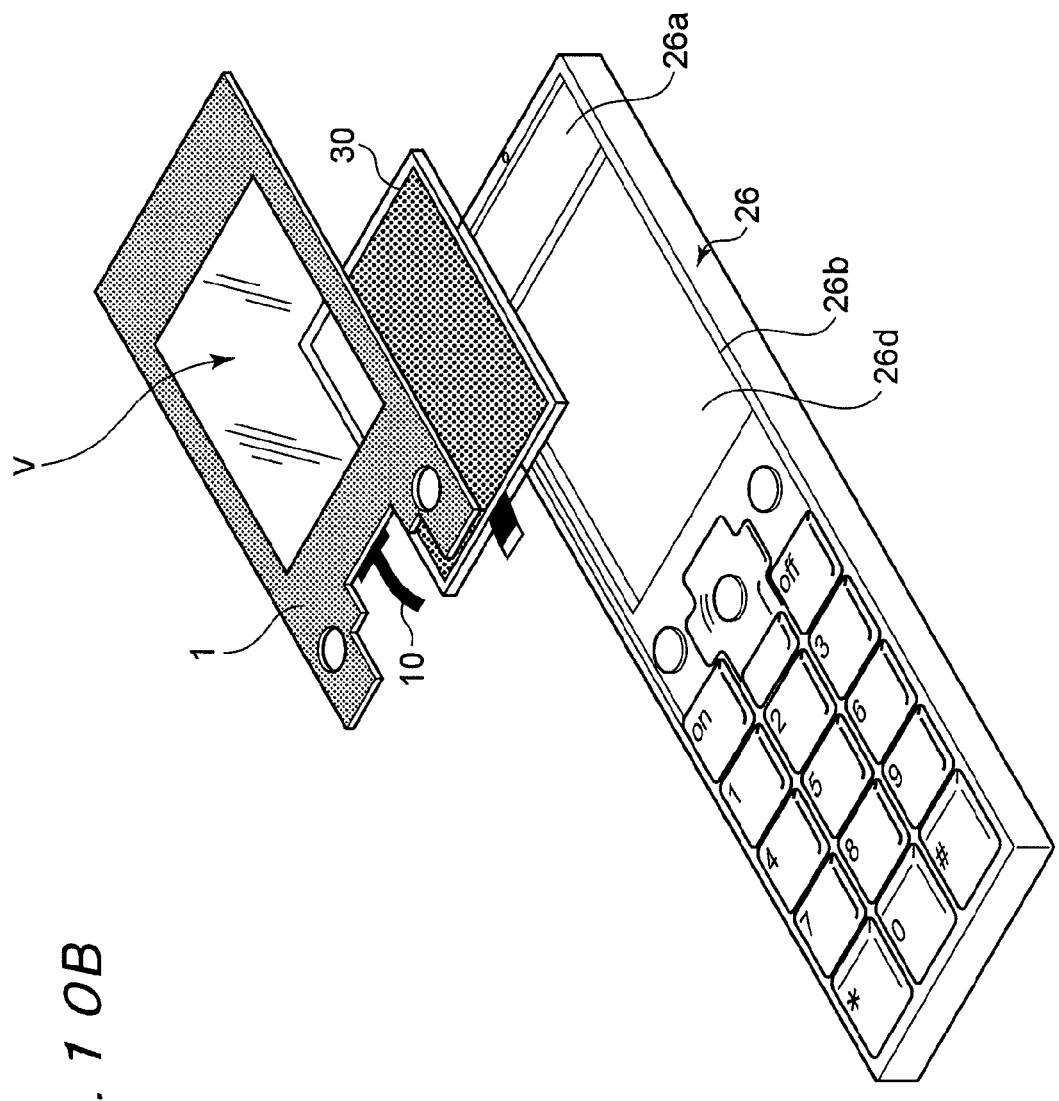
FIG. 10B is a perspective view of the electronic apparatus of a touch window type of FIG. 10A.

Moreover, as shown in FIGS. 10A and 10B, an electronic apparatus of a touch window type in accordance with another embodiment is provided with: a casing 26 having a fit-in concave section 26a to which the touch input device can be fitted, a display device 30 that is disposed on the bottom surface of the concave section 26a of the casing 26, and the touch input device 1 to be fitted into the concave section 26a of the casing 26 to cover the display device 30. On the bottom surface of the concave section 26a of the casing 26, a concave section 26d that is slightly smaller than the bottom surface is formed. This smaller concave section 26d is formed for a display device 30 to be placed therein so as to be visually recognized from the outside of the touch input device 1 through the touch input device 1, and the display device 30 is attached to the smaller concave section 26d. In this apparatus, the display device 30 is attached to the smaller concave section 26d, and the touch input device 1 is fitted into the concave section 26a of the casing 26, with the touch input device 1 being secured onto the bottom surface of the concave section 26a with the double sided tape 27 so that an outer surface 26b on the periphery of the concave section 26a of the casing 26 and the outer surface of the touch input device 1 are allowed to form the same plane. In this apparatus, sweat 24 may tend to invade therein from a gap 25 between the casing 26 and the touch input device 1 in some cases. The sweat 24, invaded into the gap 25, adheres to the water-vapor barrier film 11, and, when, in this state, a bending stress is imposed onto the water-vapor barrier film 11, in the same manner as described above, a crack might occur.

Figure 10D:
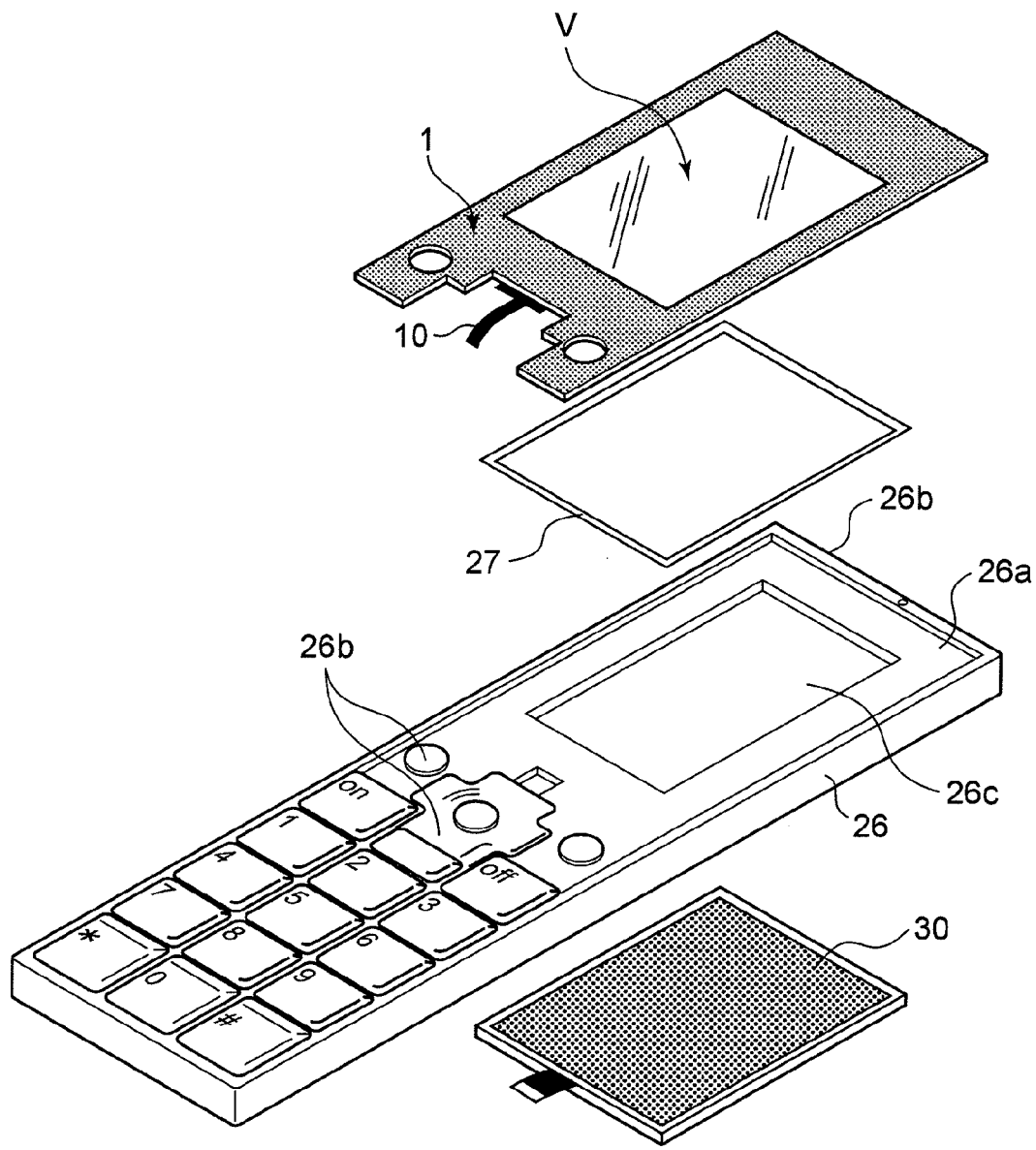
FIG. 10D is a perspective view of the electronic apparatus of the touch window type of FIG. 10C.

Moreover, as shown in FIGS. 10C and 10D, an electronic apparatus of the touch window type in accordance with still another embodiment is provided with: a casing 26 having a fit-in concave section 26a to which the touch input device can be fitted, a display device 30 that is disposed on the back side (inner side) of the bottom surface of the concave section 26a of the casing 26, and the touch input device 1 to be fitted into the concave section 26a of the casing 26 to cover the display device 30. On the bottom surface of the concave section 26a of the casing 26, an opening 26c that is slightly smaller than the bottom surface and that penetrates therethrough formed. This penetrating opening 26c is formed for a display device 30 to be placed therein so as to be visually recognized from the outside of the touch input device 1 through the touch input device 1, and the display device 30 is attached to the back side (inner side) of the concave section 26a so as to allow the display screen of the display device 30 to be exposed to the opening 26c. In this apparatus, the touch input device 1 is fitted to the concave section 26a of the casing 26, with the touch input device 1 being secured to a peripheral edge 26e of the bottom surface of the concave section 26a by using a double-sided tape 27, so that an outer surface 26b on the periphery of the concave section 26a of the casing 26 and the outer surface of the touch input device 1 are allowed to form the same plane, and the display device 30 is attached to the back side (inner side) of the concave section 26a so as to allow the display screen of the display device 30 to be exposed to the opening 26c of the concave section 26a. In this apparatus, sweat 24 tends to invade therein from a gap 25 between the casing 26 and the touch input device 1 in some cases. The sweat 24, invaded into the gap 25, adheres to the water-vapor barrier film 11, and, when, in this state, a bending stress is imposed onto the water-vapor barrier film 11, in the same manner as described above, a crack might occur.

Therefore, in these embodiments shown in FIGS. 10A to 10D, by placing the hard coat layer 21 on the water-vapor barrier film 11, it becomes possible to effectively prevent sweat 24, invaded into the gap 25, from adhering to the water-vapor barrier film 11.

Figure 11:
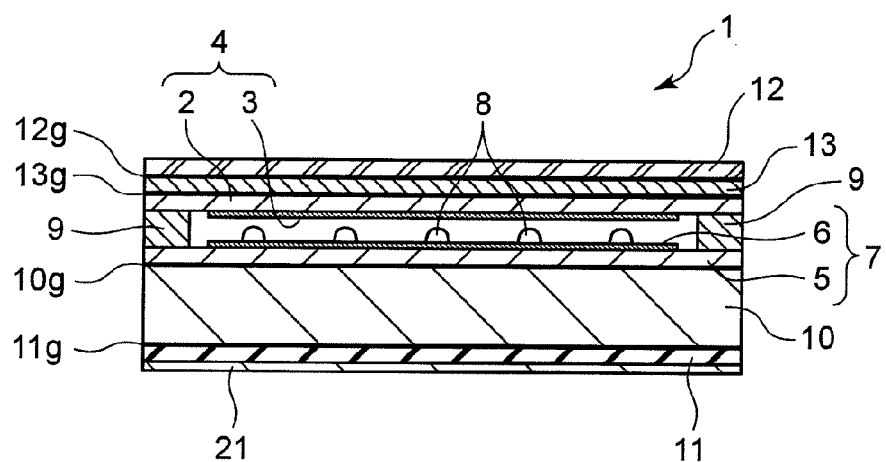
FIG. 11 is a cross-sectional view showing a touch input device in accordance with another embodiment of the present invention.

More specifically, as shown in FIG. 11, the hard coat layer 21 can be disposed over the entire surface of the lower end surface of the water-vapor barrier film 11. With this structure, even when the sweat 24, invaded into the gap 25, has reached the lower end surface of the water-vapor barrier film 11, it becomes possible to prevent the sweat 24 from adhering to the water-vapor barrier film 11 by using the hard coat layer 21.

Additionally, in the respective attached drawings of the present specification, to facilitate understanding of the structure, the width of each of the layers is illustrated in a greatly enlarged manner. For this reason, it might look as if the possibility of sweat 24 invaded into the gap 25 further invading into the water-vapor barrier film 11 from the side surface thereof was higher than the possibility thereof invading therein from the lower end surface of the water-vapor barrier film 11. However, since the actual thickness of the water-vapor barrier film 11 is about 188 μm or about 100 μm, actually, the possibility of sweat invading from the lower end surface of the water-vapor barrier film 11 is higher than the possibility of the sweat invading from the side face of the water-vapor barrier film 11. Therefore, to dispose the hard coat layer 21 on the lower end surface of the water-vapor barrier film 11 forms the most effective means.

Figure 12:
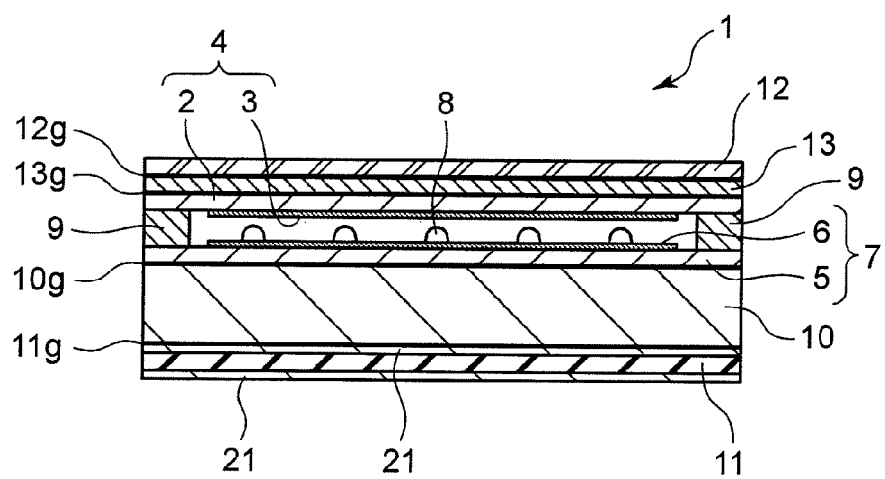
FIG. 12 is a cross-sectional view showing a touch input device in accordance with another embodiment of the present invention.

Moreover, depending on the materials forming the water-vapor barrier film 11, the above-mentioned crack 22 is sometimes caused by a solvent of a securing adhesive material 11g for the water-vapor barrier film, and in this case, as shown in FIG. 12, by disposing the hard coat layer 21 between the water-vapor barrier film 11 and the water-vapor barrier film securing adhesive material 11g, it becomes possible to prevent a solvent from invading into the water-vapor barrier film 11 by the hard coat layer 21, and consequently to positively prevent the occurrence of the crack 22 by the solvent for the water-vapor barrier film securing adhesive material 11g. Additionally, in FIG. 12, since the hard coat layer 21 is disposed between the water-vapor barrier film 11 and the water-vapor barrier film securing adhesive material 11g, with respect to the structure of FIG. 11, the hard coat layers 21 are placed on the two surfaces of the water-vapor barrier film 11 so that both of the effect for the solvent and the effect for sweat 24 can be obtained. Of course, depending on the specific cases, the hard coat layer 21 may be disposed only between the water-vapor barrier film 11 and the water-vapor barrier film securing adhesive material 11g.

Figure 13A:
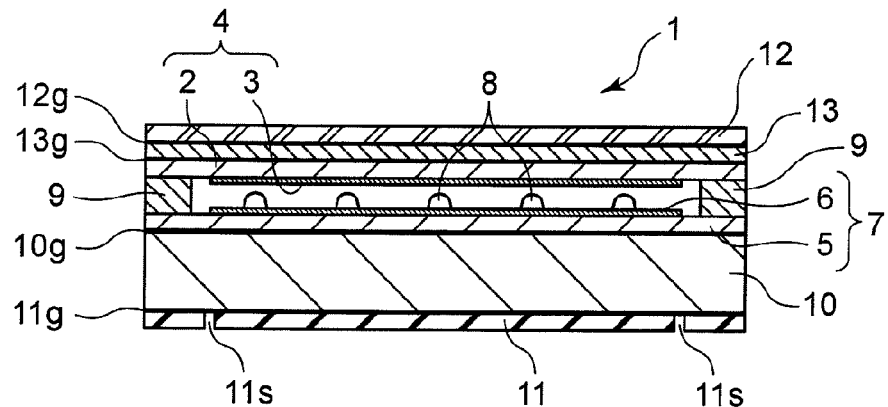
FIG. 13A is a cross-sectional view showing a touch input device in accordance with another embodiment of the present invention.
Figure 13B:
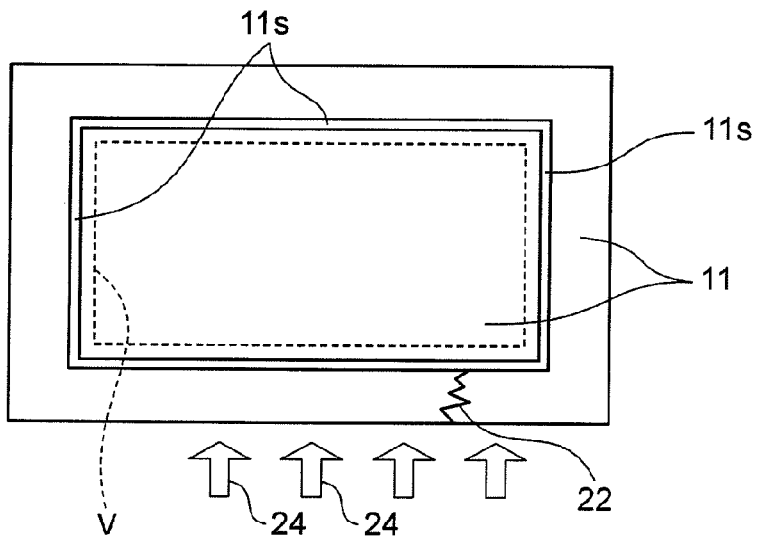
FIG. 13B is a bottom-surface view of a water-vapor barrier film of the touch input device in accordance with the embodiment of the present invention shown in FIG. 13A.

As shown in FIGS. 13A and 13B, on a position of the water-vapor barrier film 11 corresponding to an area on which the decorative layer of the design film 12 is placed or a frame area (area other than a visible area V) covered with the decorative area, a slit 11s, preferably formed into a rectangular frame shape, is formed to cover the longer sides and the shorter sides. By placing the slit 11s in this manner, even when a crack 22 develops inward from the edge portion of the water-vapor barrier film 11 by sweat 24, the advancing crack 22 can be stopped by the slit 11s so that it is possible to effectively prevent the crack 22 from advancing to the area inside of the slit 11s, that is, to the visible area V.

Figure 13C:
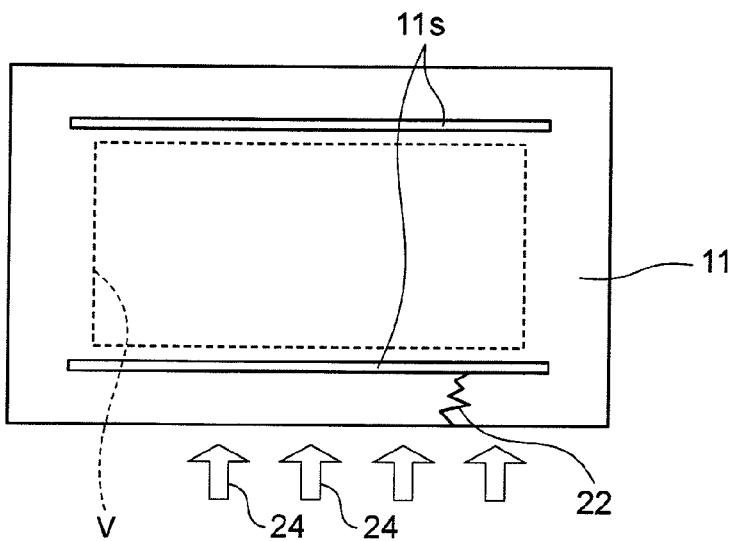
FIG. 13C is a bottom-surface view of a water-vapor barrier film of a touch input device in accordance with a modified example of the embodiment of the present invention shown in FIG. 13A.

As the method for forming the slit 11s, not limited to the method shown in FIG. 13B, in the case where the water-vapor barrier film 11 is prepared as a rectangular film, as shown in FIG. 13C, the slit 11s may be disposed only in a position corresponding to the area on which the decorative layer of the design film 12 is placed, or, a portion corresponding to the frame area (area other than a visible area V) that is covered with the decorative area and that corresponds to at least only on the longer side portion. The reason for this is because, in general, a gap through which sweat invades tends to be easily formed on the edge portion on the longer side portion of the water-vapor barrier film 11, and when sweat is allowed to invade thereto, a crack 22 tends to occur from the edge portion on the longer side portion inward in many cases; thus, by disposing the slit 11s only on the longer side portion, such an advancement of the crack 22 can be prevented.

Figure 14:
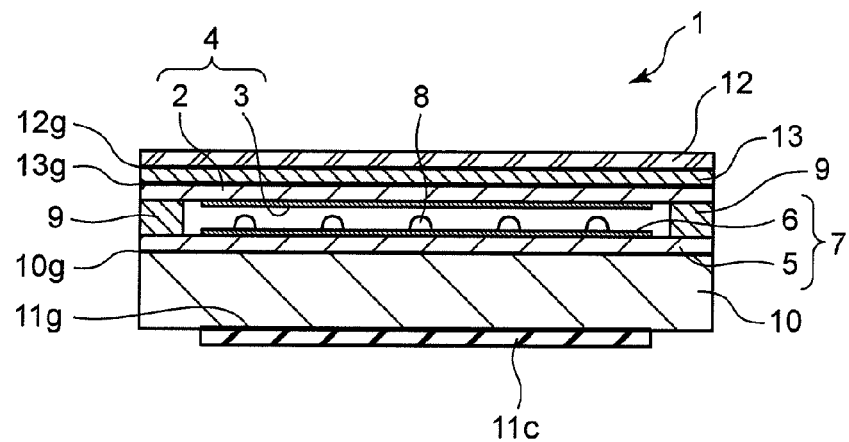
FIG. 14 is a cross-sectional view showing a touch input device in accordance with another embodiment of the present invention.

Moreover, as shown in FIG. 14, in the case where the water-vapor barrier film 11 is formed as a rectangular film, the water-vapor barrier film 11 may be disposed on an area that is larger than the visible area V of the touch input device, and that is also smaller than the surface of the plastic supporting plate 10 that is opposed to the water-vapor barrier film. With this structure, sweat 24 invaded into the gap 25 will hardly make contact with the water-vapor barrier film 11. In this case, the size of the water-vapor barrier film 11 is extended to an area smaller than the outer shape of the touch input device by 0.7 mm, even in the maximum level, and when the water-vapor barrier film 11 is made larger than this, it is not possible to obtain the target effects.

Figure 15:
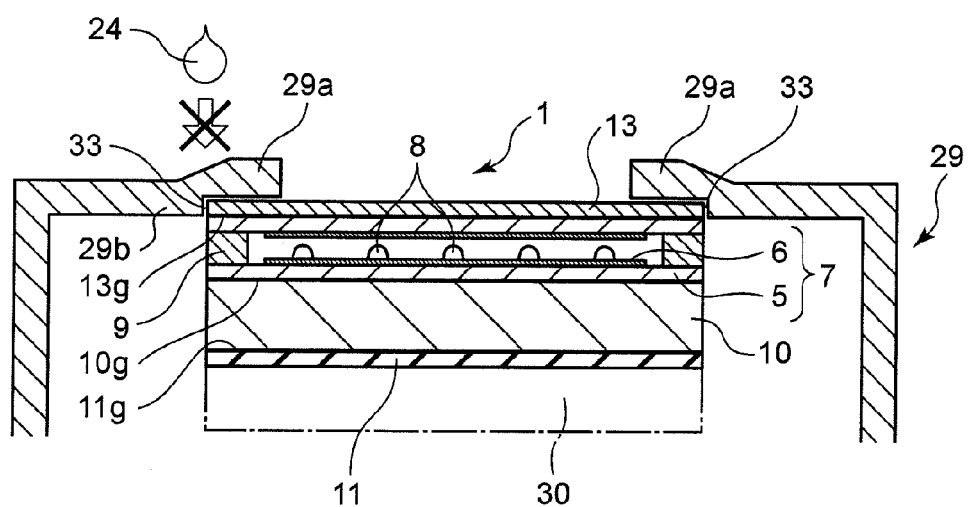
FIG. 15 is a partial cross-sectional view of an electronic apparatus of a touch panel type provided with a touch input device in accordance with another embodiment of the present invention.

Moreover, FIG. 15 is a partial cross-sectional view of an electronic apparatus of a touch panel type provided with the touch input device 1 in accordance with another embodiment of the present invention. The casing 29 of the electronic apparatus of the touch panel type is provided with a bezel 29a that plugs the gap 33 between the touch input device 1 and an attaching portion 29b of the casing 29, and in general, sweat 24 can be prevented from invading into the gap 33 by the bezel 29a. Should sweat or fat and oil invade therein through the gap between the bezel 29a and the touch input device 1, the aforementioned effects can be obtained because the embodiments are applied.

In each of the embodiments or modified examples, the thickness of the hard coat layer 21 of the water-vapor barrier film 11 is set to 1 μm to 7 μm. In the case where the thickness of the hard coat layer 21 is thinner than 1 μm, it becomes difficult to control the thickness of the coating layer (to form into a uniform thickness), resulting in the possibility of failure in obtaining a sufficient hard coating characteristic. In the case where the thickness of the hard coat layer 21 becomes thicker than 7 μm, the flexibility of the hard coat layer 21 deteriorates so as to cause a bending stress to be applied, which results in the possibility of a crack in the hard coat layer 21 (the bending resistant rigidity is lowered). In an attempt to ensure the thickness uniformity and the bending resistant rigidity more positively, the range of thickness is more preferably set to 2 μm to 5 μm.

Moreover, the entire surface bonding processes of the respective films may be carried out by using a pressure sensitive adhesive (PSA), (not shown). As the method for applying the PSA, a normal printing method, such as a screen printing method, an offset printing method, a gravure printing method, or a flexographic printing method, may be used.

The following description will discuss specific working examples of the embodiments of the present invention.

Working Example 1

An upper electrode film, which has a thickness of 188 μm, is constituted by a transparent insulating film of PET and an upper electrode of ITO. A lower electrode film, which has a thickness of 125 μm, is constituted by a transparent insulating film of PET and a lower electrode of ITO. A plastic supporting plate, which has a thickness of 0.8 mm, is made of an acrylic plate. A water-vapor barrier film, which has a thickness of 188 μm, is made of a Zeonoa film (made by Zeon Corporation). The size of a touch window (with a design film) serving as one example of a touch input device constituted by these members is set to 50 mm×110 mm. The thickness of the hard coat layer 21 is 3 μm.

With respect to a warp in the initial state of this touch window, when placed with the design film surface facing up, the distance of each corner portion from the placed surface (when a touch window is placed on a flat surface, the distance between the placed flat surface and each of the corner portions of the touch window) is 0.7 mm on average in the case of a conventional structure (without a water-vapor barrier film); however, the distance is 0.1 mm on average in the case of working example 1 (with a water-vapor barrier film). With respect to a warp during an environmental test under a temperature of 60° C. and a humidity of 90%, when placed with the design film surface facing up, the distance of each corner portion from the placed surface (when a touch window is placed on a flat surface, the distance between the placed flat surface and each of the corner portions of the touch window) is 1.5 mm on average in the case of the conventional structure (without a water-vapor barrier film); however, it is 0.3 mm on average in the case of working example 1 (with a water-vapor barrier film). Thus, by bonding the water-vapor barrier film thereto, the warp in each of the initial state and a high-temperature high-humidity state can be greatly improved.

Working Example 2

An upper electrode film, which has a thickness of 125μ, is made of a ¼λ ITO film serving as a ¼λ phase-difference film. A lower electrode film, which has a thickness of 125μ, is made of a ¼λ ITO film serving as a ¼λ phase-difference film. A polarizing plate, which has a thickness of 110μ, is prepared through processes in which a polyvinyl alcohol film (containing iodine) is drawn, and triacetyl cellulose films are bonded to its two surfaces. A plastic supporting plate, which has a thickness of 0.9 mm, is made of an acrylic plate. A water-vapor barrier film has a thickness of 100 μm, and is made of an ARTON film (made by JSR Corporation) with a hard coat. The size of a touch window (with a design film) with a circular polarizing function, serving as one example of a touch input device, constituted by these members is set to 48 mm×96 mm. The thickness of the hard coat layer 21 is 3 μm.

In working example 2, when an environmental test was carried out under a temperature of 60° C. and a humidity of 90%, the warp was greatly improved in the same manner as in working example 1.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

A touch input device in accordance with the present invention and an electronic apparatus provided with the touch input device, which relate to a touch input device provided with a plastic supporting plate formed by a polycarbonate resin or an acrylic resin and an electronic apparatus having the touch input device, are not subjected to degradation of reliability and input stability in touch input depending on the use environment, and are installed in a portable electronic apparatus equipped with a display device having a liquid crystal panel, an organic EL panel, or the like, such as a cordless telephone, a portable telephone, an electronic calculator, a sub-notebook personal computer, a PDA (personal-digital-assistant), a digital camera, a video camera, or the like, and these are effectively used as a touch input device in which a positional input is carried out by pressing a screen with a finger, a pen, or the like, from above, in accordance with instructions of the screen that is viewed through the screen, and an electronic apparatus provided with the touch input device.

The invention claimed is:

1. A touch input device of a resistance film system, the touch input device comprising:
    an upper electrode film provided with an upper electrode made of a transparent conductive film formed on a lower surface of a transparent insulating film;
    a lower electrode film provided with a lower electrode made of a transparent conductive film formed on an upper surface of a transparent insulating film, wherein the upper electrode and the lower electrode are opposed to each other with insulating spacers interposed therebetween;
    a plastic supporting plate made from a polycarbonate resin or an acrylic resin, the plastic supporting plate being bonded to an entire lower surface of the lower electrode film, with an adhesive material being interposed therebetween; and
    a water-vapor barrier film, made of a cyclo-olefin polymer film or a cyclo-olefin copolymer film, for improving a moisture-resistant property of the plastic supporting plate, the water-vapor barrier film being positioned on the lower surface of the plastic supporting plate,
    wherein the water-vapor barrier film further comprises a protective layer or a slit formed on an area other than a visible area of the water-vapor barrier film, and wherein cracking of the water-vapor barrier film is reduced or prevented.

2. The touch input device according to claim 1, wherein the water-vapor barrier film has properties of a water-absorbing rate of from larger than 0% to not larger than 0.1% and a moisture expansion coefficient of $4.0\times10^{-6}$ cm/cm/% RH or less.

3. The touch input device according to claim 1, wherein the transparent insulating film forming the lower electrode film is made from a same material as that of the plastic supporting plate, and the water-vapor barrier film has properties of a water-absorbing rate of from larger than 0% to 0.1% or less and a moisture expansion coefficient of $4.0\times10^{-6}$ cm/cm/% RH or less.

4. The touch input device according to claim 1, wherein the plastic supporting plate has a thickness of 0.5 to 2 mm and the water-vapor barrier film has a thickness of 50 to 200 μm.

5. The touch input device according to claim 1, wherein a design film having a transparent window portion is placed on the entire upper surface of the upper electrode film with an adhesive material being interposed therebetween.

6. The touch input device according to claim 1, further comprising:
    a protective layer for a water-vapor barrier film placed on one of surfaces of the water-vapor barrier film, that is, on a surface on an opposite side to an opposed surface to the plastic supporting plate.

7. The touch input device according to claim 1, further comprising:
    a protective layer for a water-vapor barrier film placed between the plastic supporting plate and the water-vapor barrier film.

8. The touch input device according to claim 1, wherein protective layers for a water-vapor barrier film are respectively placed on two surfaces of the water-vapor barrier film.

9. The touch input device according to claim 1, wherein the water-vapor barrier film is a rectangular film, and has a slit being formed on an area other than a visible area of the water-vapor barrier film, along each of longer sides opposed to each other.

10. The touch input device according to claim 1, wherein the water-vapor barrier film is a rectangular film, and has a slit that has a rectangular frame shape being placed on an area other than a visible area of the water-vapor barrier film.

11. The touch input device according to claim 1, wherein the water-vapor barrier film is a rectangular film, and the water-vapor barrier film is placed in an area that is larger than a visible area of the touch input device, and also smaller than an opposed surface of the plastic supporting plate to the water-vapor barrier film.

12. An electronic apparatus comprising:
    a casing provided with a concave section for use in fitting a touch input device thereto;
    a display device disposed on a bottom surface of the concave section of the casing; and the touch input device disclosed in claim 1 that is fitted to the concave section of the casing so as to cover the display device.

13. An electronic apparatus comprising:

a casing having a concave section for use in fitting a touch input device thereto, provided with an opening formed on a bottom surface thereof;

a display device that is disposed on a back side of the concave section so as to allow a display screen to be exposed to the opening of the bottom surface of the concave section of the casing; and the touch input device disclosed in claim 1 that is fitted to the concave section of the casing so as to cover the display screen of the display device.

14. The touch input device according to claim 1, wherein the water-vapor barrier film is disposed so as to be parallel to upper and lower surfaces of the touch panel device.

\* \* \* \* \*